Feb. 7, 1956   H. PEYRIN ET AL   2,733,892
THRUST BEARINGS, ESPECIALLY FOR TURBINE AND GENERATOR UNITS
Filed July 10, 1951   3 Sheets-Sheet 1
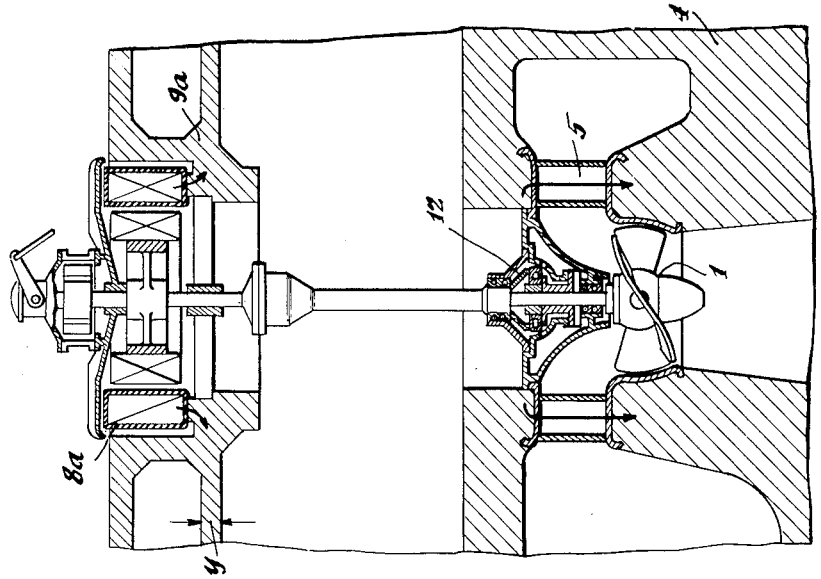
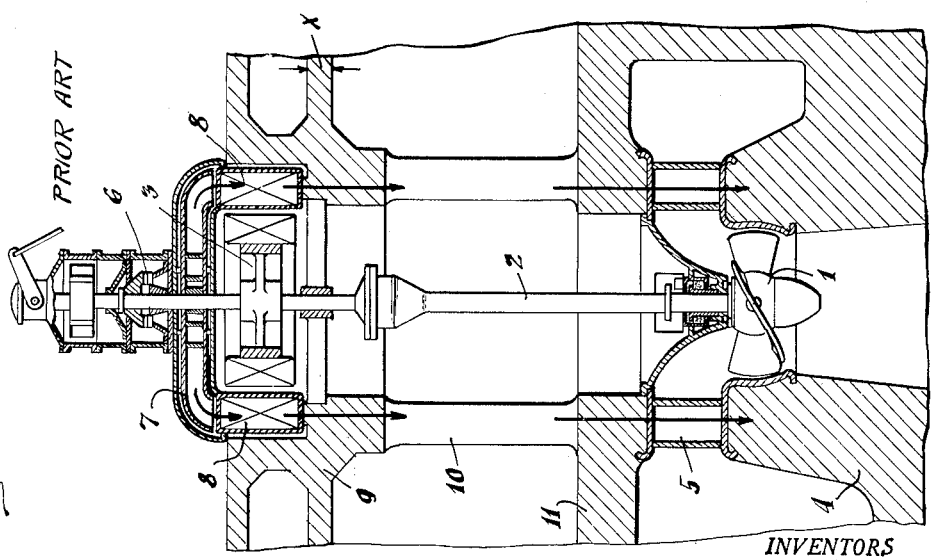
INVENTORS
HENRI PEYRIN
BY S. X. CASACCI
George Hlavrey
ATTORNEY

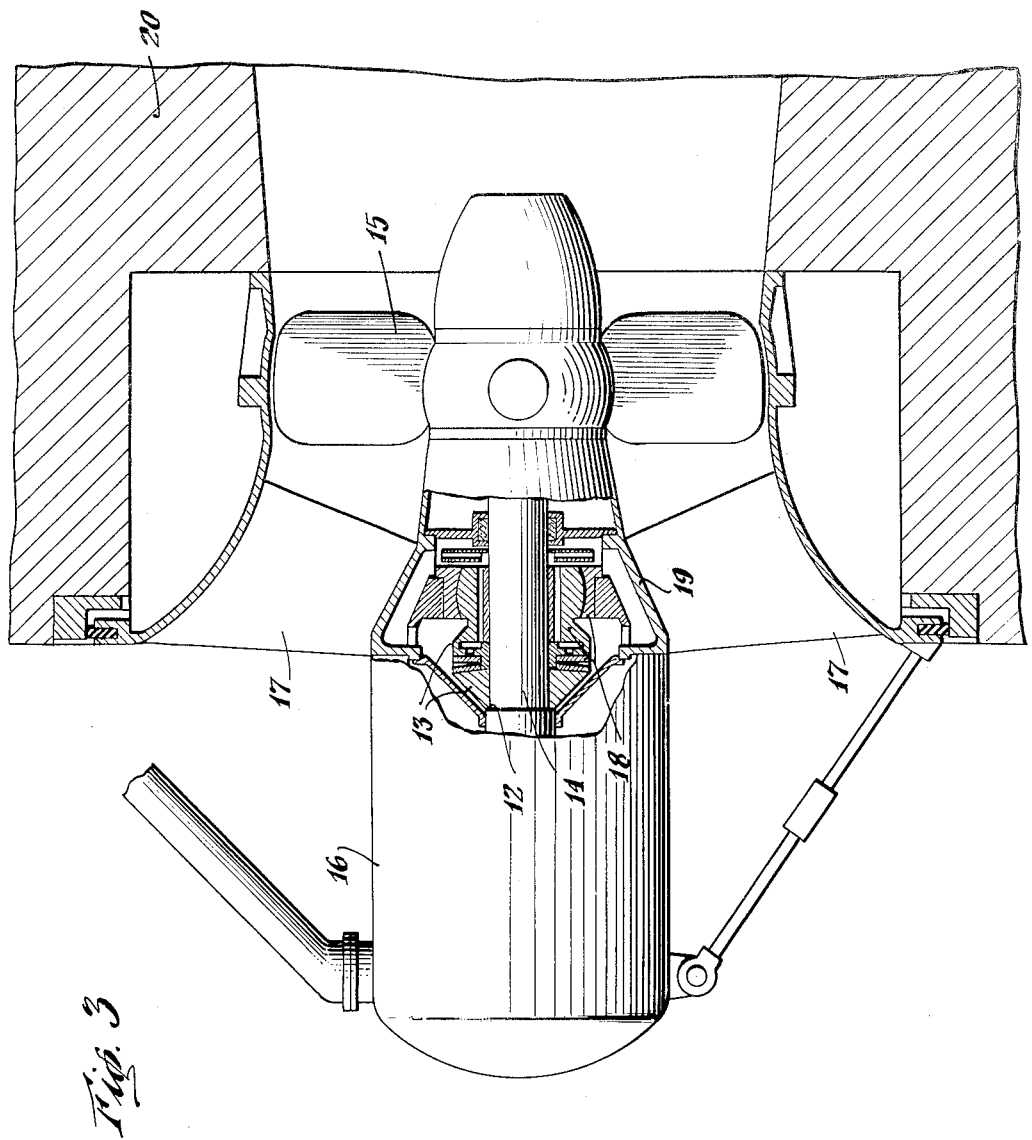

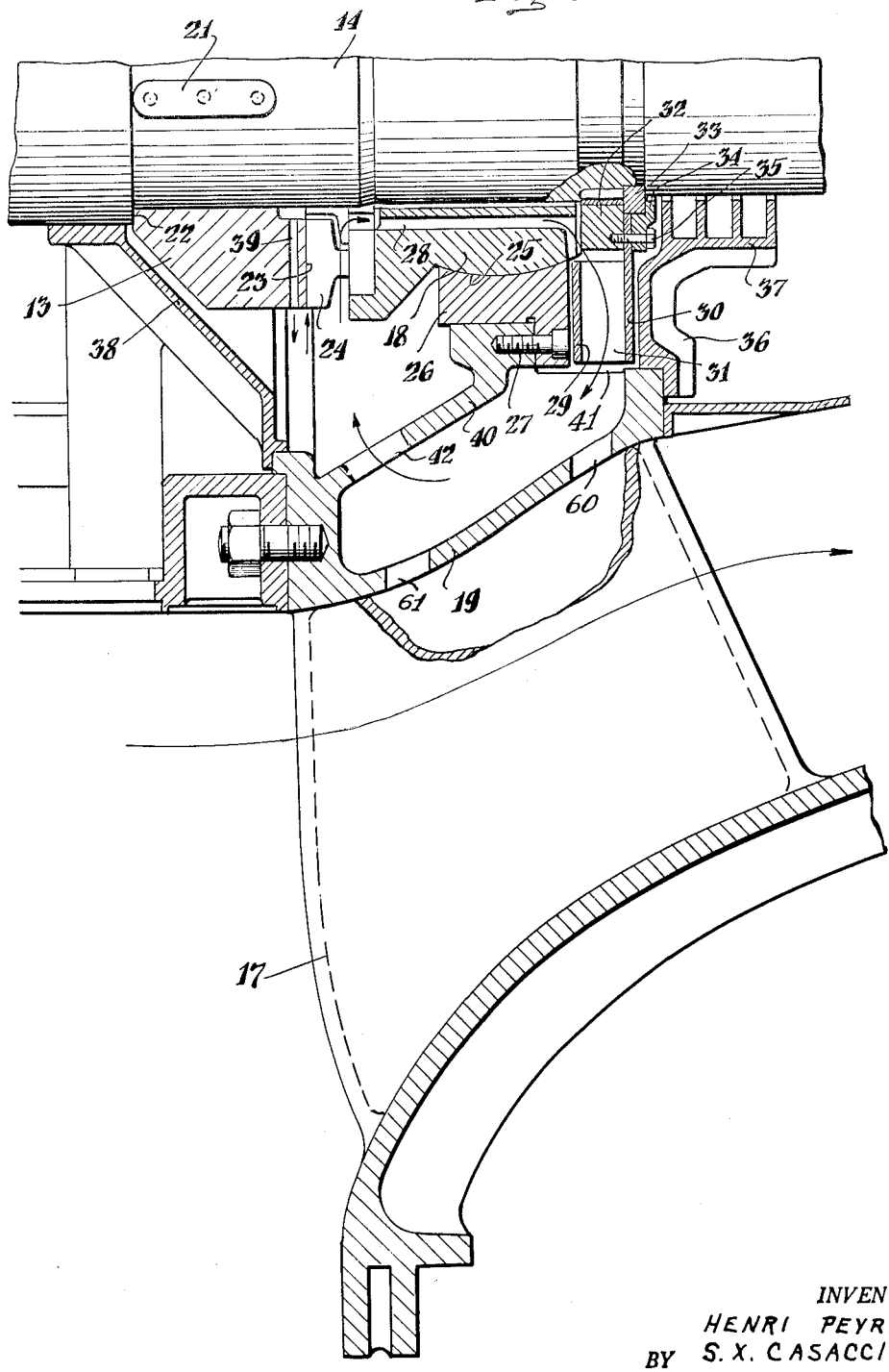

United States Patent Office 2,733,892
Patented Feb. 7, 1956

2,733,892

THRUST BEARINGS, ESPECIALLY FOR TURBINE AND GENERATOR UNITS

Henri Peyrin and Severin Xavier Casacci, Grenoble, France, assignors to Etablissements Neyrpic, Grenoble, France, a corporation of France Application July 10, 1951, Serial No. 236,002

Claims priority, application France July 11, 1950

2 Claims. (Cl. 253—148)

The present invention relates to thrust bearings, and particularly to thrust bearings for use in turbine and generator units. The invention is illustrated herein as applied to a hydraulic turbine and generator unit. Certain features of the invention are of particular utility in connection with such a unit, while other features are of general utility in thrust bearings.

In turbine and generator units, particularly units of the type including a hydraulic turbine coupled through a shaft to a generator, it is necessary to provide a thrust bearing to receive the axially reactive forces from the shaft and transmit them to the masonry foundation or other supporting structure. The thrust bearing is usually placed at the generator end of the shaft, and the reactive force is usually transmitted to the supporting structure through the generator frame. The thrust bearing may alternatively be mounted on an appropriate framework of its own, which framework transmits the thrust forces from the bearing to the foundation.

Such an arrangement insures satisfactory transmission of the mechanical forces. However, the structures required take up substantial space at the end of the shaft of the unit. A special framework is required usually in the form of a truss, which, in order to have the necessary strength, must have substantial size, resulting in high costs of fabrication and installation.

In some other arrangements, the bearing structure is located between the generator and the turbine, but is spaced from the turbine runner, and it is equally necessary to provide a truss framework for supporting it.

Furthermore, the construction of the thrust bearings of the types described required the provision of a special tank of oil for the lubrication of the bearing and apparatus for the cooling of that oil.

An object of the present invention is to provide an improved thrust bearing structure for a turbine and generator unit which avoids the difficulties described above, and which may be easily and efficiently constructed and improved.

In carrying out the foregoing and other objects of the invention, the thrust collar which receives the axial forces from the shaft of the turbine and generator unit, is located in the interior of the distributor casing, which is at least partly submerged and located upstream from the turbine, and in close proximity to the turbine runner. The thrust collar is located within the part of the casing immediately adjacent to the turbine. The thrust collar may be supported by a thrust block which relays the forces to the casing carrying the fixed parts of the turbine distributor, or the thrust collar may be supported directly upon the casing.

This arrangement has three advantages:

a. It permits the direct transmission of forces from the thrust collar to the distributor, which in turn transmits the same to the foundation supporting the unit, so that the truss framework common in the prior art structures may be eliminated. In that manner the weight of the unit is reduced and the size of the supporting structures required is similarly reduced.

b. The thrust collar is located in the middle of the unit, so that the structure necessary to support it at the end of the shaft of the unit is eliminated, which ensures a substantial reduction in the length of the unit.

c. Finally, since the thrust bearing is located within the interior of the distributor casing, that casing acts as a tank for lubricating oil for the thrust bearing. Furthermore, the flow of water over the outside walls of the distributor casing is utilized to cool the oil and thereby the bearing.

The use of the present invention results in a substantial economy in the weight of the unit and of the supporting structure.

The details and advantages of the present invention may be more completely described with reference to the annexed drawings, in which Fig. 1 shows schematically a turbine and generator unit of the prior art.

Fig. 2 shows in a similar schematic manner a turbine and generator unit constructed in accordance with the present invention.

Fig. 3 is a view partly in elevation and partly in section of a submerged turbine and generator assembly constructed in accordance with the invention, and Fig. 4 is a sectional view similar to Fig. 3, but on a much larger scale, showing the thrust bearing structure of Fig. 3.

A turbine and generator assembly of a conventional type is shown in Fig. 1, and includes a turbine runner 1 connected by a vertical shaft 2 to a generator 3. The unit is supported on a foundation of masonry 4. A distributor 5 controls the flow of water to the runner 1. The downward thrust on the shaft 2 due to the weight of the rotating parts and to the hydraulic force acting on the turbine runner 1 is transmitted through a thrust bearing 6. This bearing 6 is located at the upper end of the shaft 2 and is carried by a truss framework 7 resting on the frame 8 of the generator. The forces transmitted through the bearing 6 are in turn transmitted to the foundation 4 through a floor 9, pillars 10, a platform 11 which covers the turbine and finally through the stationary parts of the distributor 5.

Fig. 2 shows a similar turbine and generator unit, provided with a thrust bearing constructed in accordance with the present invention. In Fig. 2, those parts which correspond fully to their counterparts in Fig. 1 have been given the same reference characters and will not be further described.

In Fig. 2, a thrust bearing 12 is located immediately above the turbine runner 1. It should be noted that the location of the bearing 12 is not merely between the turbine and the generator, but is very close to the turbine runner, that is to say, in the part of the casing which is closest to the turbine. This bearing 12 is disposed at approximately the level of the distributor 5. The bearing 12 includes a rotary bearing member fixed on the shaft and a stationary bearing member supported by the radially extending frame of the distributor, which is axially aligned with the bearing. The thrust taken by the bearing 12 is transmitted directly to the frame of the distributor 5 and through it to the foundation 4. The beam framework 7 of Fig. 1 is eliminated in Fig. 2. The unit of Fig. 2 is thereby made shorter than the unit of Fig. 1. The reduction in size is substantially equal to the space occupied in Fig. 1 by the framework 7 and the bearing 6.

The floor 9a of Fig. 2 only supports the weight of the stationary parts of the generator 3 and of the superstructure of the unit. It is therefore possible to eliminate the pillars 10 which were necessary in the structure of Fig.

1 and to reduce the thickness (y) of the floor 9a as compared to the thickness (x) of the floor 9 in Fig. 1.

The details of the bearing construction, not clearly shown in Fig. 2 may be the same as those shown in Fig. 4.

This invention may advantageously be applied to turbine and generator units of the completely submerged type, as shown in Fig. 3. These units are intended for low or medium head hydroelectric plants, and are of the same general type as that described in the copending application of Jean Claude Guimbal, Serial No. 193,851, filed November 3, 1950, entitled Combined Turbine and Generator Unit, now Patent 2,634,375, issued April 7, 1953.

As shown in Fig. 3, a rotary bearing member or thrust collar 13 is attached to the shaft 14 between the turbine runner 15 and the generator 16. The thrust collar 13 is substantially aligned with the fixed guiding elements 17 of the distributor. The details of the bearing structure are shown on a larger scale on Fig. 4. The thrust collar 13 cooperates with a stationary bearing member or thrust block 18, which is supported on the casing 19 of the distributor 17. The reactive forces from the turbine runner are communicated to the shaft 14 of the unit and are then transmitted by the thrust collar 13 to the thrust block 18 and thence through the distributor structures 19 and 17, to the foundation 20. No special framework or intermediate force-transmitting structure is required. This arrangement provides a substantial reduction in the length of the unit and a considerable lightening of the parts.

The thrust collar 13 is keyed, as shown at 21, to the shaft 14 of the unit and abuts against a shoulder 22 formed on that shaft. The right hand end of the collar 13, as it appears in the drawings, is spaced from the shaft 14 and terminates in a flat surface 23 perpendicular to the axis of the unit. The surface 23 abuts against a ring of bearing shoes 24 which in turn engage the left hand surface of the thrust block 18. The ring of shoes 24 is a conventional type of bearing structure using a film of oil, sometimes referred to as a Kingsbury bearing.

The thrust block 18 has an internal diameter slightly greater than the diameter of shaft 14, so that there is a small space between the inside of the block and the shaft. The peripheral surface of the right hand portion of the thrust block is given a convex spherical contour, as shown at 25. The thrust block 18 is supported by a bushing 26 having an inner concave spherical contour and attached to the casing 19 by means of bolts 27. Bushing 26 is constructed in two or more segments. The thrust block 18 is provided with a number of oil passages 28 parallel to the axis of the shaft 14. These passages, as described below, provide for the circulation of cooling oil. This cooling arrangement is one of the features of a bearing constructed in accordance with the present invention.

A centrifugal pump is attached to the shaft 14 adjacent the end of the thrust block opposite to that which carries the ring of bearing shoes 24. This pump is formed by two annular discs 29 and 30, connected by spaced vanes 31. The disc 30 abuts against a ring 32 which is keyed to the shaft 14. The pump 29, 30, 31 and the ring 32 are attached to a ring 33, formed in two segments, and a flanged ring 34. The flanged ring 34 and the disc 30 of the pump are attached to the ring 32 by means of bolts 35, so that the segmented ring 33 is clamped between ring 32 and the inner flange on ring 34. The ring 33 is in a groove formed in the shaft 14, so that this arrangement serves to limit the longitudinal displacement of the rotating parts of the turbine and generator assembly.

The assembly including the thrust collar 13, the thrust block 18 and the centrifugal pump 29, 30, 31 is enclosed in a chamber defined by the casing 19, a plate 36 which encircles the shaft 14 and carries a seal 37, and by a partition 38.

The thrust collar 13 is provided with radial oil passages 39.

The casing 19 is provided with an interior wall 40 concentric with its outer wall so that the casing has a double wall providing a space within which the cooling oil may flow. Openings 41 and 42 allow passage of the oil into and out of the space between the double walls.

The bearing structure is lubricated efficiently, with a forced circulation of the lubricant. The oil flows from the radially outer ends of the centrifugal pump vanes 31 through the opening 41 into the space between the double walls of casing 19. The outer wall of this casing is cooled by the water in which the unit is submerged, the direction of water flow being indicated by an arrow in Fig. 4. It should be noted that the water flow is in a direction opposite to the direction of flow of the oil in the double-walled casing. The oil passes out of the double wall of the casing through passage 42 and then flows through the spaces between the shoes 24 into the annular space defined by those shoes, the right hand end of the thrust collar 13 and the shaft 14. From that space, it may flow to the right either between the shaft and the thrust block 18, or through the passages 28 to the inlet or radially inner ends of the centrifugal pump blades 31. From the annular space inside the shoes 24, the oil may also flow outwardly through the passages 39 formed in the thrust collar 13. The flow is outward through these passages because of the centrifugal force acting on the oil therein due to the rotation of thrust collar 13.

As mentioned above, the direction of flow of oil in the double wall of the casing 19 is opposite to the direction of flow of the water. This counter-current arrangement, as is well known, provides for a more efficient heat transfer between the cooling water and the oil being cooled. The heat of friction developed in the bearing is carried by the circulating oil to the outer wall of the casing, so that the heat is carried away by the water flowing past the unit.

The heat radiating surface of the casing 19 may be increased by providing for circulation of oil through the interior of the fixed vanes of the distributor 17 which may be made hollow for this purpose.

In the modification of Fig. 4, the thrust collar 13, the ring of shoes 24, the thrust block 18, the centrifugal pump 29, 30, 31, the rings 32 and 34 and the seal 37 are each constructed in one piece and then put in place in sequence over the end of the shaft. This arrangement substantially increases the precision of the machining and the precision of the assembly. It should be understood that in order to assemble these parts on the shaft, the runner of the turbine must be coupled to the end of the shaft by a removable coupling. A suitable coupling is shown in our co-pending application Serial No. 237,631, filed July 19, 1951.

In the wall 19 are formed openings 60 and 61 respectively oppositely disposed to the opening 41 from the pump 29, 30, 31 and to the opening 42, Fig. 4. These openings as shown in Fig. 4 lead to the hollow space within the fixed distributor vane 17. Although the oil may circulate through the space between the walls 19 and 40 as above described, the provision of the openings 60 and 61 makes possible the flow of the oil through the interior of the vane 17 so that this oil may be cooled by the water flowing past the vane 17 through the hydraulic passage of the turbine.

Although the direction of flow of water in Figs. 3 and 4 is shown as generally horizontal, and the axis of the shaft is likewise shown horizontal, it should be understood that the shaft may be mounted vertically or at any intermediate angular position, without substantial variation in the thrust bearing structure.

We claim:

1. A hydraulic turbine assembly comprising a turbine having a rotor, a shaft supporting said turbine rotor for rotation therewith on the axis of said shaft, a thrust bearing member carried by said shaft for rotation therewith, a stationary thrust bearing member cooperating with said rotating thrust bearing member to oppose the axial thrust of said shaft and said rotor, a casing extending about the axis of said shaft and enclosing said bearing members, means for supporting said stationary thrust bearing member on said casing interiorly thereof, said casing providing a wall of a passage for water flowing through said turbine for driving said turbine and cooled by the water flowing through said passage, means including said casing for confining a lubricant within said casing, means for circulating said lubricant alternately over said bearing members and into contact with said cooled wall, and hollow frame members supported in said turbine assembly and extending generally radially with respect to the axis of said shaft across said passage and connected to said casing for supporting said casing and said thrust bearing members supported thereby, said wall of said casing having openings therein communicating with the space within said hollow frame members for circulation of said lubricant from within said casing through the space of said hollow frame members for cooling said lubricant by the water flowing through said passage past said frame members.

2. A hydraulic turbine assembly comprising a turbine having a rotor, a shaft supporting said turbine rotor for rotation therewith on the axis of said shaft, a thrust bearing member carried by said shaft for rotation therewith, a stationary thrust bearing member cooperating with said rotating thrust bearing member to oppose the axial thrust of said shaft and said rotor, a casing extending about the axis of said shaft and enclosing said bearing members, means for supporting said stationary thrust bearing member on said casing interiorly thereof, said casing being supported in said turbine assembly and providing a wall of a passage for water flowing through said turbine for driving said turbine and cooled by the water flowing through said passage, means including said casing for confining a lubricant within said casing, said stationary and rotating thrust bearing members being disposed to provide an annular space between said members and said shaft and extending along said shaft, one of said bearing members being formed of spaced shoes engaging the other bearing member, the spaces between said shoes providing for flow of lubricant from the space within said casing to said annular space extending along said shaft, centrifugal pump members attached to said shaft and having their radially inner ends adjacent the end of said annular lubricant space that is spaced along said shaft from said thrust bearing members for receiving lubricant from said space, and means providing fluid communication between the radially outer ends of said centrifugal pump members and the space within said casing for circulating the lubricant from said thrust bearing through said annular space into engagement with said casing for cooling said lubricant by the water flowing in contact with said casing.

References Cited in the file of this patent

UNITED STATES PATENTS

| | | |
|---|---|---|
| 1,736,966 | Delaval-Crow | Nov. 26, 1929 |
| 1,748,892 | Nagler | Feb. 25, 1930 |
| 1,760,904 | Howarth | June 3, 1930 |
| 1,900,924 | Firth | Mar. 14, 1933 |
| 2,077,883 | Hand | Apr. 20, 1937 |
| 2,634,375 | Guimbal | Apr. 7, 1953 |

FOREIGN PATENTS

| | | |
|---|---|---|
| 202,630 | Switzerland | July 17, 1939 |
| 936,103 | France | Feb. 16, 1948 |